(12) United States Patent
Wu

(10) Patent No.: US 9,127,426 B2
(45) Date of Patent: Sep. 8, 2015

(54) SECURING AND WATERPROOF MECHANISM OF A FLOODGATE APPARATUS

(71) Applicant: Tung-Lin Wu, Taichung (TW)

(72) Inventor: Tung-Lin Wu, Taichung (TW)

( * ) Notice: Subject to any disclaimer, the term of this patent is extended or adjusted under 35 U.S.C. 154(b) by 87 days.

(21) Appl. No.: 14/147,605

(22) Filed: Jan. 6, 2014

(65) Prior Publication Data

US 2015/0191885 A1    Jul. 9, 2015

(51) Int. Cl.
    *E06B 3/26*         (2006.01)
    *E02B 7/28*         (2006.01)
    *E02B 7/54*         (2006.01)
    *E06B 9/02*         (2006.01)

(52) U.S. Cl.
    CPC ... *E02B 7/28* (2013.01); *E02B 7/54* (2013.01); *E06B 9/02* (2013.01)

(58) Field of Classification Search
    CPC ... B25B 5/142; B25B 5/101; E06B 2009/002; E06B 9/02; E06B 2009/007; E04B 2/7425; E04B 2002/742; E04B 1/6116; E02B 7/54; E02B 7/34; E02B 7/28; E04H 17/168
    USPC ............ 405/87, 90, 103, 104, 107, 114, 122, 405/123; 52/126.1, 126.3, 126.4, 243, 52/243.1, 584.1, 202, 203, 780, 169.6, 52/169.14, 479; 49/463, 464
    See application file for complete search history.

(56) References Cited

U.S. PATENT DOCUMENTS

| | | | | |
|---|---|---|---|---|
| 1,006,730 | A | * | 10/1911 | Dougherty et al. ............. 405/87 |
| 6,042,301 | A | * | 3/2000 | Sovran .......................... 405/112 |
| 6,393,782 | B1 | * | 5/2002 | Berridge et al. ................ 52/239 |
| 7,552,565 | B1 | * | 6/2009 | Smith ............................. 52/202 |
| 8,001,735 | B2 | * | 8/2011 | Fisher ............................ 52/202 |
| 2011/0213271 | A1 | * | 9/2011 | Telfort et al. ................. 600/586 |
| 2012/0243941 | A1 | * | 9/2012 | Hazenberg ...................... 405/87 |

\* cited by examiner

*Primary Examiner* — David Bagnell
*Assistant Examiner* — Carib Oquendo

(57) ABSTRACT

A securing and waterproof mechanism of a floodgate apparatus includes a pillar, a water retaining gate, a pair of retaining bases and a securing member. The pillar has a retaining groove for receiving the water retaining gate. The retaining bases are attached to two opposite sides of the pillar. Each retaining base has at least one vertical channel. The securing member has two hook portions at one side. Each hook portion has a horizontal bar and a vertical bar extending upward from a distal end of the horizontal bar. Under this arrangement, the vertical bar of each hook portion is fitted in the vertical channel of the respective retaining base to prevent the securing member from sliding horizontally off the respective retaining base.

6 Claims, 7 Drawing Sheets

SECURING AND WATERPROOF MECHANISM OF A FLOODGATE APPARATUS

BACKGROUND OF THE INVENTION

1. Field of the Invention

The present invention relates to a floodgate apparatus, and more particularly to a securing and waterproof mechanism of a floodgate apparatus for securing a water retaining gate tightly.

2. Description of Related Art

Referring to FIG. 7, a conventional floodgate includes a pillar 80 and a plurality of retaining bases 81 assembled at opposite sides of the pillar 80. Each of the retaining bases 81 has a horizontal hole 811 passing therethrough. A securing member 82 has two horizontal bars 821 respectively formed at two lateral sides thereof. Each horizontal bar 821 is able to be inserted into the horizontal hole 811 of the respective retaining base 81. The securing member 82 has a screw hole vertically defined in one end thereof. A screw bar 83 is screwed into the screw hole of the securing member 82. The pillar 80 has a retaining groove 801 defined therein. When a water retaining gate is placed into the retaining groove 801 of the pillar 80, one end of the screw bar 83 is applied to press toward the water retaining gate. Thereby, a user is able to screw the screw bar 83 up and down for securing or loosing the water retaining gate.

However, the conventional floodgate is not able to provide a useful operation to make the securing member secured to the respective retaining base tightly since each horizontal bar of the securing member may be slid out of the horizontal hole of the respective retaining base easily. Furthermore, the conventional floodgate is not able to reduce a gap between the inner walls of the retaining groove of the pillar and the water retaining gate. It is possible to cause the flowing water to leak from one side to another side of the water retaining gate through this gap.

The present invention has arisen to mitigate and/or obviate the disadvantages of the conventional floodgate.

SUMMARY OF THE INVENTION

The main objective of the present invention is to provide an improved floodgate.

To achieve the objective, a securing and waterproof mechanism of a floodgate apparatus, which is applied to secure a water retaining gate, comprises at least one pillar, a pair of retaining bases, a securing member and a fastener. The pillar has a retaining groove defined therein. The water retaining gate is inserted in the retaining groove of the pillar. The retaining bases are attached to two opposite sides of the pillar. The two retaining bases are disposed at an identical altitude. Each of the retaining bases defines at least one vertical channel therethrough. The securing member has two hook portions at one side and a screw hole defined at the other side. Each of the two hook portions has a horizontal bar and a vertical bar extending upward from a distal end of the horizontal bar. The fastener has a screw bar screwed into the screw hole of the securing member, an abutting plate defined at one end of the screw bar and a handle mounted at the other end of the screw bar so as to drive the fastener to move up and down for securing or loosing the water retaining gate.

Under this arrangement, the vertical bar of each hook portion of the securing member is fitted in the vertical channel of the respective retaining base to prevent the securing member from sliding horizontally off the respective retaining base, and the horizontal bar of the each hook portion abuts against a bottom of the respective retaining base to retain the securing member against the respective retaining base.

Further benefits and advantages of the present invention will become apparent after a careful reading of the detailed description with appropriate reference to the accompanying drawings.

DETAILED DESCRIPTION OF THE INVENTION

Figure 1:
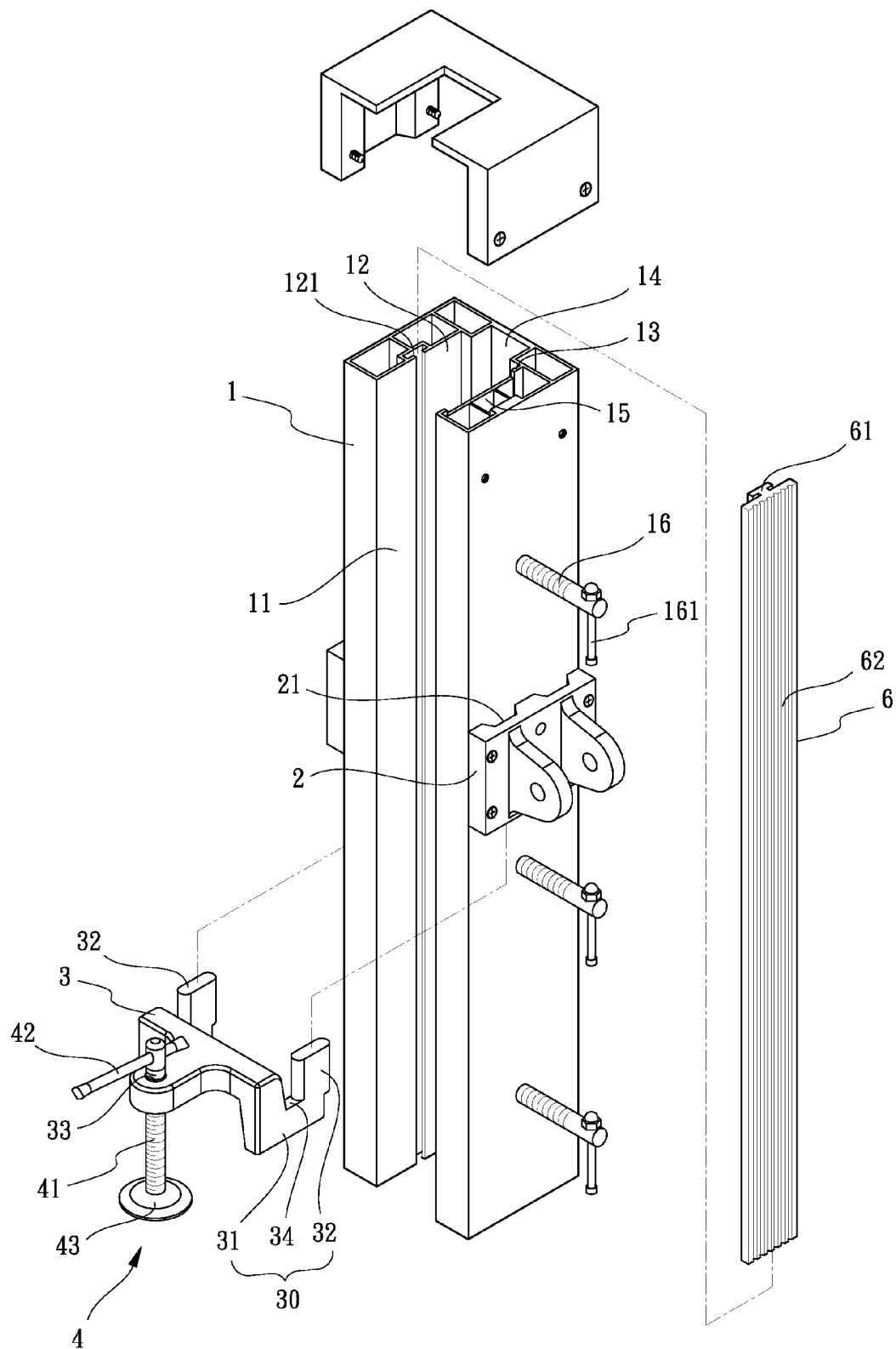
FIG. 1 is an exploded perspective view of a securing and waterproof mechanism of a floodgate apparatus in accordance with a preferred embodiment of the present invention.

Referring to FIGS. 1-4, a securing and waterproof mechanism of a floodgate apparatus in accordance with a preferred embodiment of the present invention comprises at least one pillar 1, a water retaining gate 5, a pair of retaining bases 2, a securing member 3 and a fastener 4. The pillar 1 has a retaining groove 11 defined therein. The water retaining gate 5 is inserted in the retaining groove 11 of the pillar 1 so that the water retaining gate 5 could be positioned by the pillar 1.

The retaining bases 2 are attached to two opposite sides of the pillar 1 and disposed at an identical altitude. Each of the retaining bases 2 has at least one vertical channel 21 defined therethrough. The securing member 3 has two hook portions 30 at one side and a screw hole 33 defined at the other side of the securing member 3. Specifically, each of the two hook portions 30 has a horizontal bar 31 and a vertical bar 32 extending upward from a distal end of the horizontal bar 31. Furthermore, the fastener 4 has a screw bar 41 screwed into the screw hole 33 of the securing member 3, an abutting plate 43 defined at one end of the screw bar 41 and a handle 42 mounted at the other end of the screw bar 41 so as to drive the fastener 4 to move up and down for securing or loosing the water retaining gate 5.

Under this arrangement, the vertical bar 32 of each hook portion 30 of the securing member 3 could be fitted in the vertical channel 21 of the respective retaining base 2 so as to prevent the securing member 3 from sliding horizontally out of the respective retaining base 2. Furthermore, each horizontal bar 31 of the respective hook portion 30 abuts against a bottom of the respective retaining base 2 so as to retain the securing member 3 against the respective retaining base 2.

Referring to FIG. 1, each of the two hook portions 30 of the securing member 3 is substantially U-shaped, which defines a notch 34 therein so as to allow the vertical bar 32 of the respective hook portion 30 to be inserted into the vertical channel 21 of the respective retaining base 2. The pillar 1 has a pair of inner walls 12, 13 and a bottom wall 14 defined around the retaining groove 11 of the pillar 1. One of the inner walls 12 has a C-shaped track 121 defined therein. A rubber strip 6 is disposed at the inner wall 12 with the C-shaped track 121. Specifically, the rubber strip 6 has a T-shaped block 61 extending from one side thereof and exactly fitted in the C-shaped track 121 of the inner wall 12. Therefore, the rubber strip 6 could be positioned at the later wall 12 by the T-shaped block 61 fitted in the C-shaped track 121. In addition, the rubber strip 6 has a plurality of waterproof streaks 62 disposed thereon so as to enhance the waterproof effect and abut against the water retaining gate 5 steadily.

Figure 2:
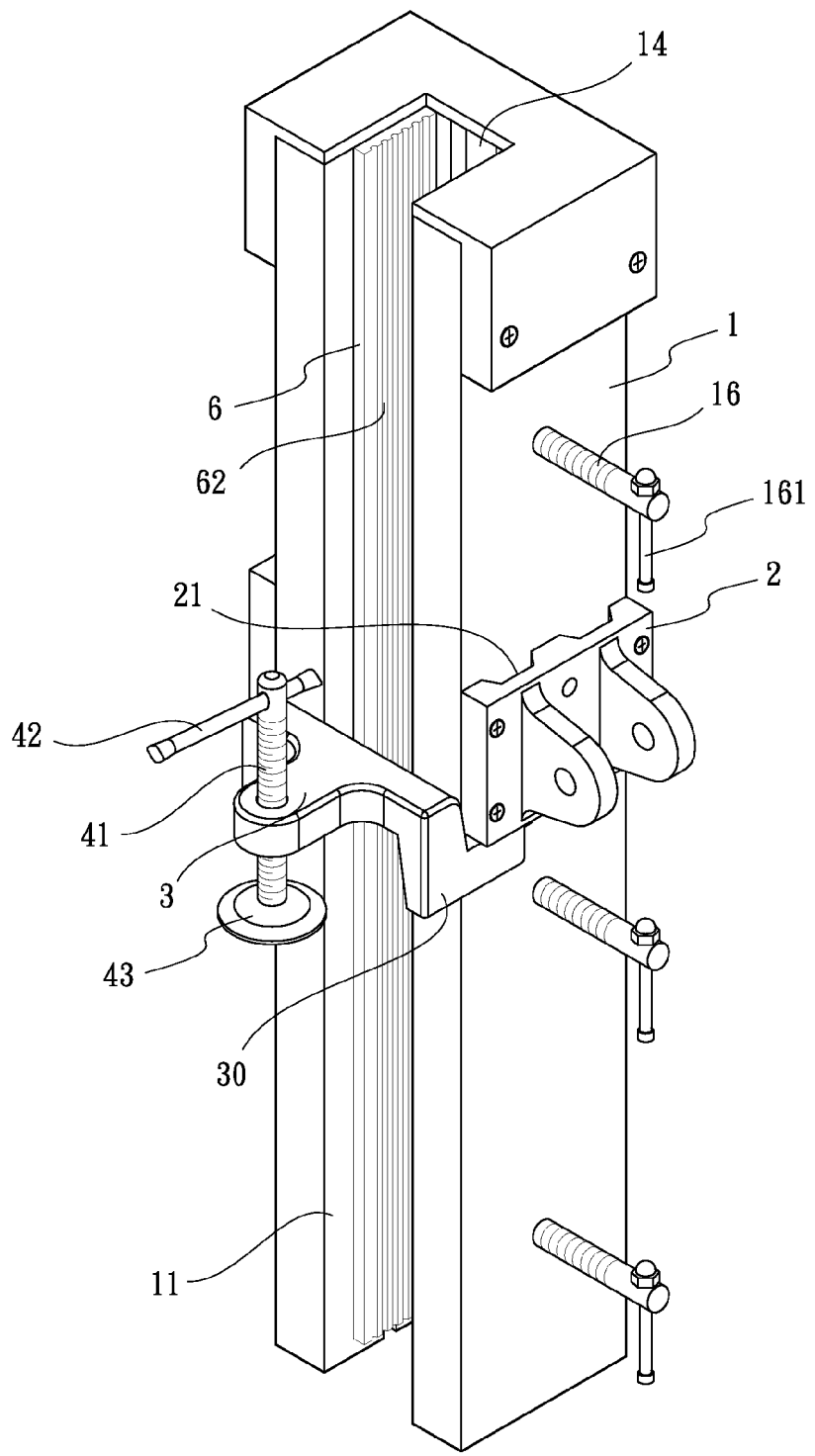
FIG. 2 is a perspective view of the securing and waterproof mechanism of the floodgate apparatus of FIG. 1.
Figure 3:
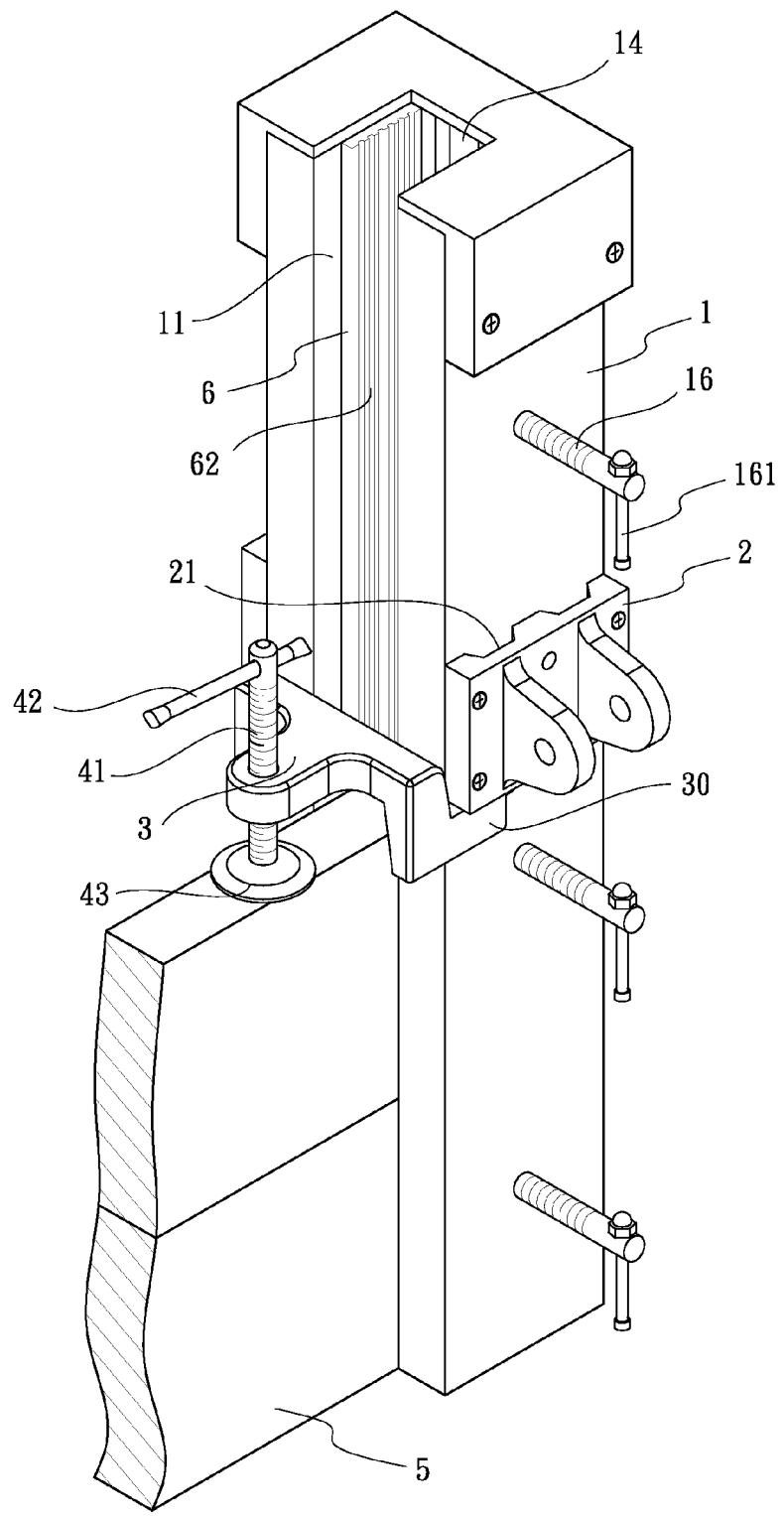
FIG. 3 illustrates a water retaining gate inserted in a retaining groove of securing and waterproof mechanism of the floodgate apparatus of FIG. 2.

Referring to FIGS. 1-3, when the water retaining gate 5 is placed into the retaining groove 11, the waterproof streaks 62 face and contact with the water retaining gate 5. The rubber strip 6 is configured to reduce a gap between the water retaining gate 5 and the inner walls 12, 13 so as to prevent the water from being leaked into the water retaining gate 5. Furthermore, the pillar 1 has a movable plate 15 arranged on the other inner wall 13 opposite to the rubber strip 6. A plurality of adjusting bars 16 pass through the pillar 1 and connected to the movable plate 15 with one end. Each of the adjusting bar 16 has a control bar 161 mounted at the other end thereof for pushing the movable plate 15 to secure the water retaining gate 5 tightly.

Figure 4:
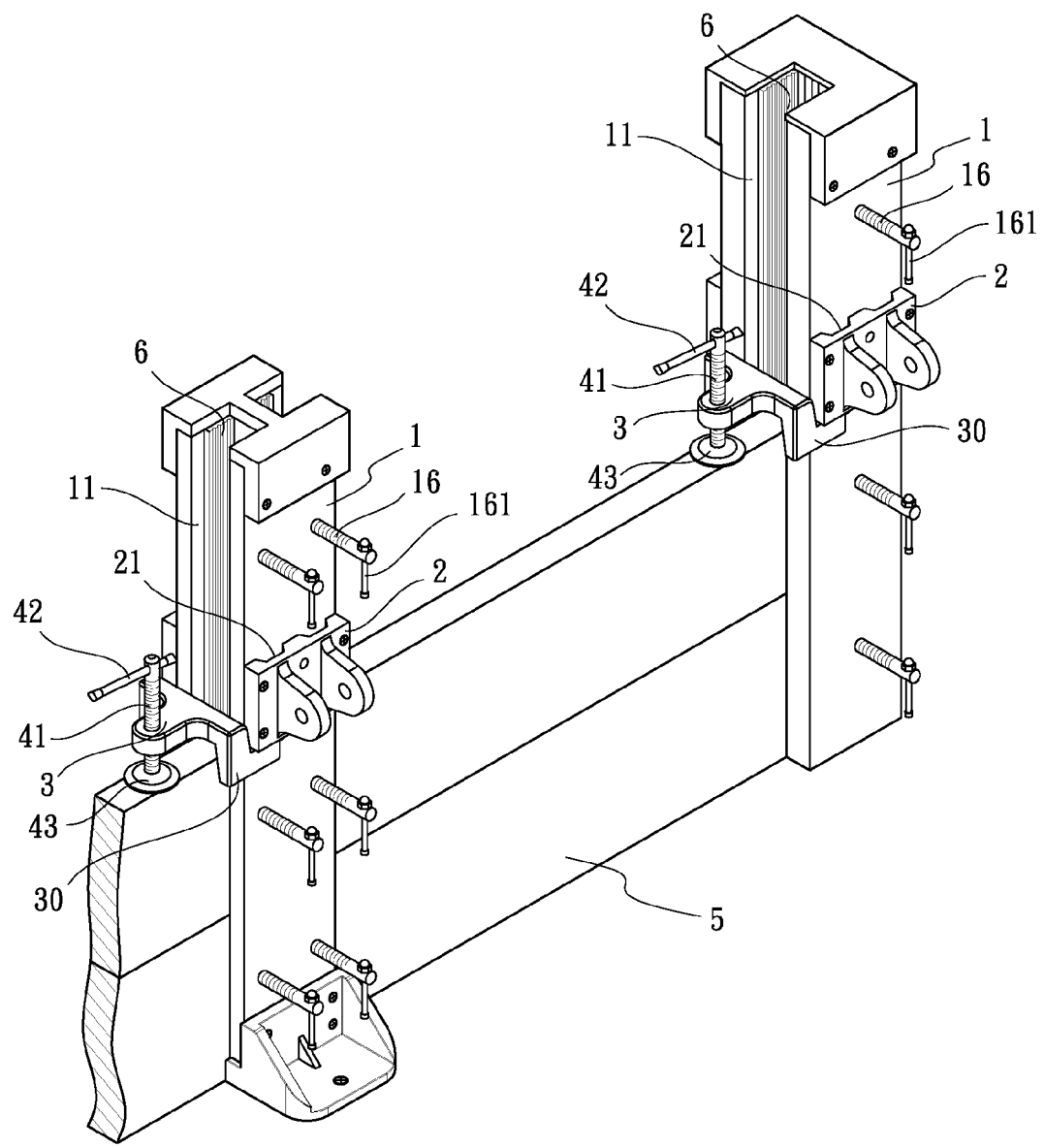
FIG. 4 is a perspective view for showing the water retaining gate arranged with the securing and waterproof mechanism of the floodgate apparatus.

FIG. 4 illustrates that a plurality of water retaining gates 5 are restricted by two pillars 1. The two pillars 1 are arranged on the ground in a prearranged distance. The water retaining gates 5 are received in the retaining groove 11 of the respective pillar 1 and secured by a plurality of securing members 3 and fasteners 4 so as to form a floodgate. A user is able to socket the vertical bar 32 of the respective securing member 3 into the vertical channel 21 of the respective retaining base 2 and to drive the handle 42 for controlling the abutting plate 43 to tightly secure the water retaining gate 5. Consequently, the horizontal bar 31 is abutted against the bottom of the respective retaining base 2 tightly and the securing member 3 is combined with the retaining bases 2 stably. The rubber strip 6 abuts against the water retaining gate 5 to hinder the water leaking from one side to another side of the water retaining gate 5. Thus the present invention provides two benefits for tightly securing the water retaining gate 5 and waterproofing.

Figure 5:
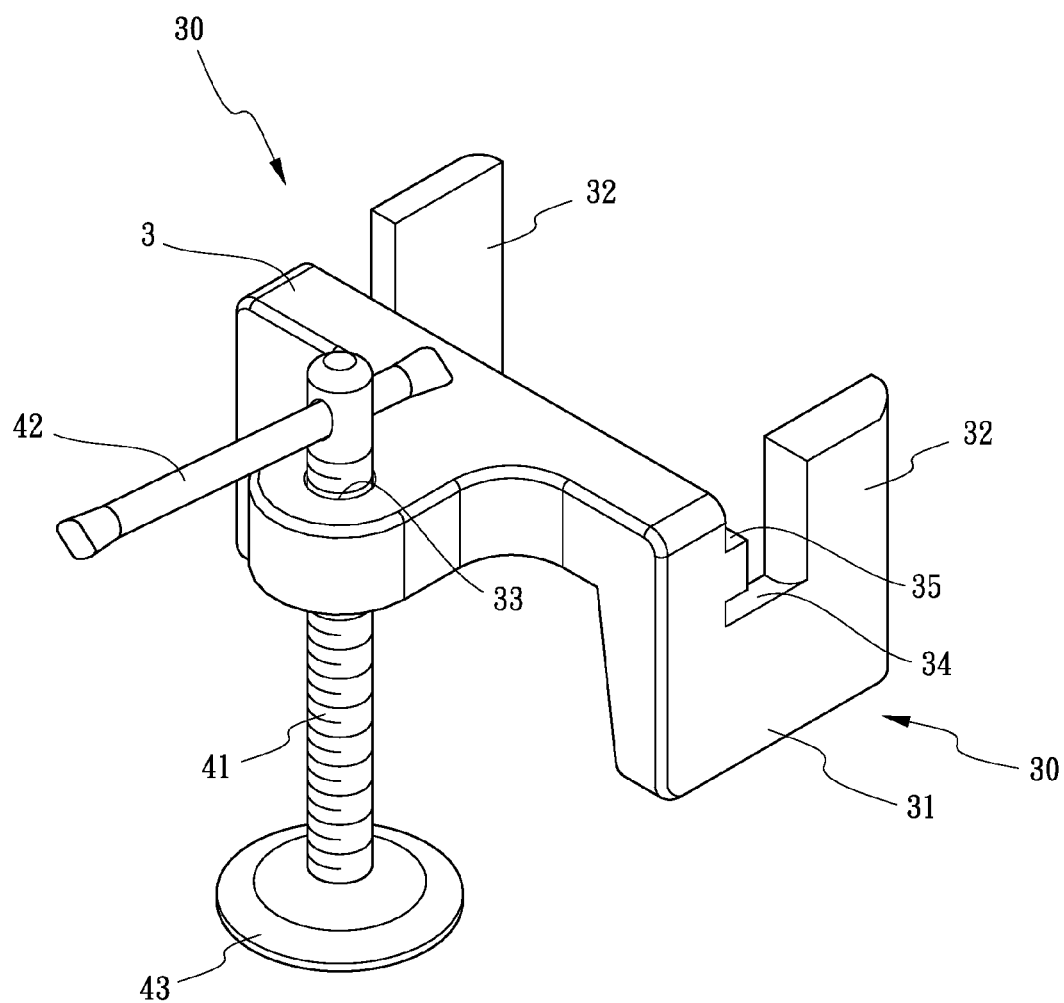
FIG. 5 is a perspective view of a securing member in accordance with second embodiment of the present invention.

Referring to FIG. 5, which shows another embodiment of the present invention, each hook portion 30 of the securing member 3 further has a bump 35 defined on a side wall of the notch 34 opposite to the vertical bar 32. The bump 35 of the respective hook portion 30 is configured to abut against a side wall of the respective retaining base 2 which provides the securing member 3 attached to the retaining bases 2 steadily.

Figure 6:
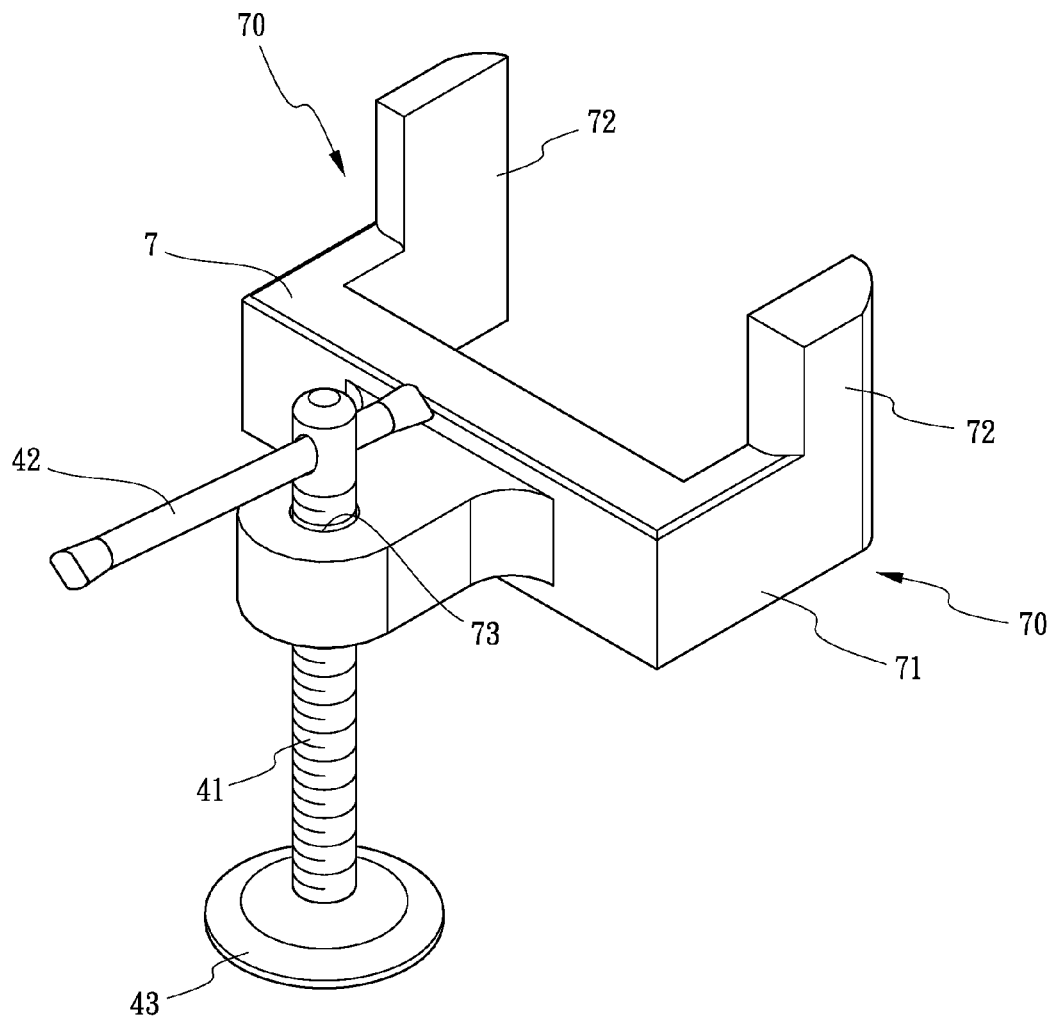
FIG. 6 is a perspective view of a securing member in accordance with third embodiment of the present invention.
Figure 7:
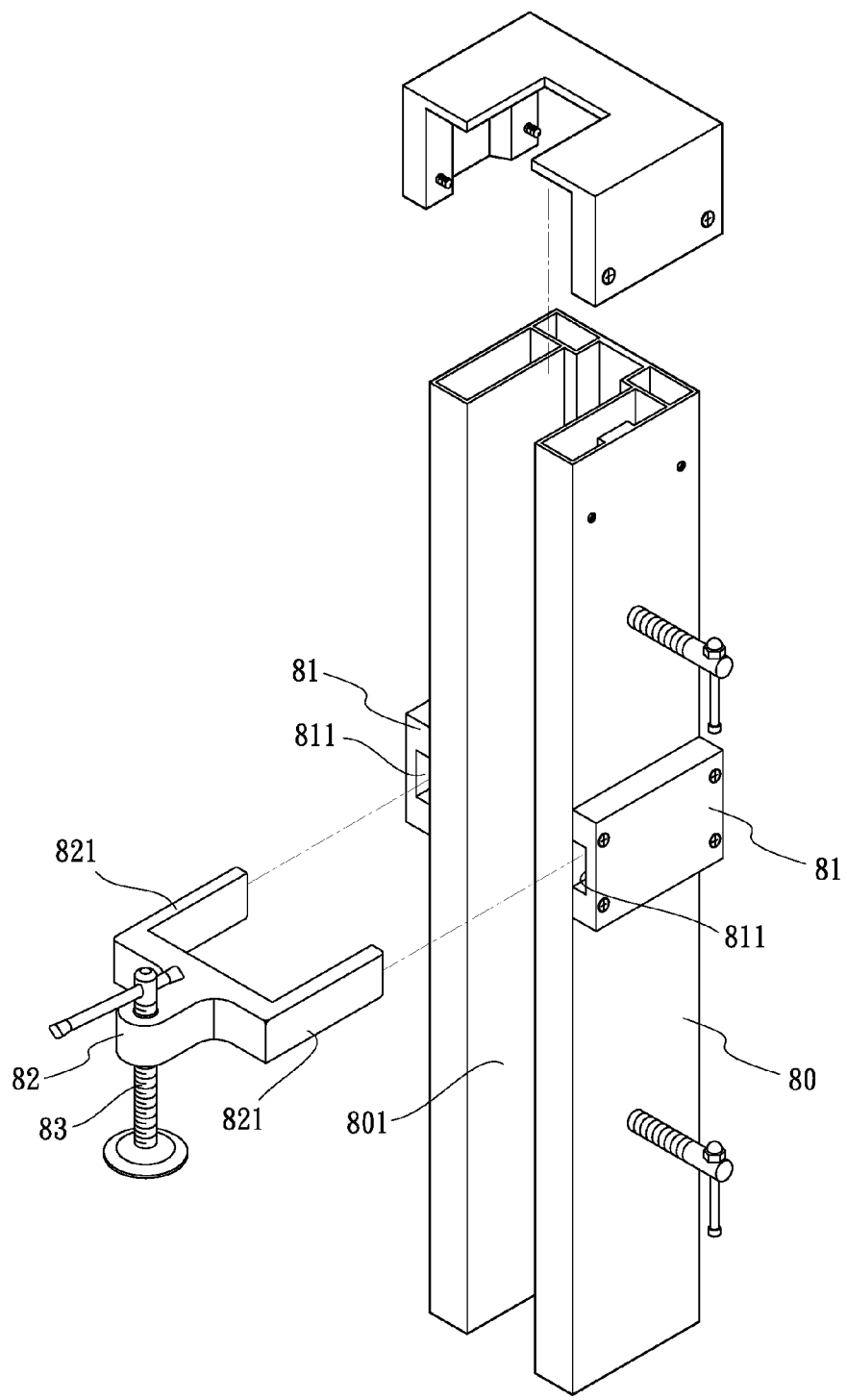
FIG. 7 is a prior art.

Referring to FIG. 6, which shows the other embodiment of the present invention, a securing member 7 has two hook portions 70 at one side and a screw hole 73 defined at the other side of the securing member 7. Specifically, each of the two hook portions 70 of the securing member 7 is substantially L-shaped, which has a horizontal bar 71 and a vertical bar 72 extending upward from a distal end of the horizontal bar 71.

It is to be understood that the disclosed embodiments are illustrative in nature and the invention is not to be limited to any one or more embodiments except as set forth in the following claims.

What is claimed is:

1. A securing and waterproof mechanism of a floodgate apparatus, which is applied to secure a water retaining gate, comprising:
    at least one pillar having a retaining groove defined therein, the water retaining gate being inserted in the retaining groove of the pillar;
    a pair of retaining bases attached to two opposite sides of the pillar, the two retaining bases disposed at an identical altitude, each of the retaining bases defining at least one vertical channel therethrough;
    a securing member having two hook portions at one side and a screw hole defined at the other side, each of the two hook portions having a horizontal bar and a vertical bar extending upward from a distal end of the horizontal bar; and
    a fastener having a screw bar screwed into the screw hole of the securing member, an abutting plate defined at one end of the screw bar and a handle mounted at the other end of the screw bar so as to drive the fastener to move up and down for securing or loosing the water retaining gate;
    wherein the vertical bar of each hook portion of the securing member is fitted in the vertical channel of the respective retaining base to prevent the securing member from sliding horizontally off the respective retaining base, and the horizontal bar of the each hook portion abuts against a bottom of the respective retaining base to retain the securing member against the respective retaining base.

2. The securing and waterproof mechanism of the floodgate apparatus as claimed in claim 1, wherein each hook portion of the securing member is substantially U-shaped, which defines a notch therein so as to allow the vertical bar of the respective hook portion to be inserted into the vertical channel of the respective retaining base.

3. The securing and waterproof mechanism of the floodgate apparatus as claimed in claim 2, wherein each hook portion of the securing member is formed with a bump on a side wall of the notch opposite to the vertical bar.

4. The securing and waterproof mechanism of the floodgate apparatus as claimed in claim 1, wherein the pillar has a pair of inner walls and a bottom wall defined around the retaining groove of the pillar; one of the inner walls has a C-shaped track defined therein; a rubber strip has a T-shaped block extending from one side thereof and fitted in the C-shaped track.

5. The securing and waterproof mechanism of the floodgate apparatus as claimed in claim 4, wherein the rubber strip has a plurality of waterproof streaks disposed thereon.

6. The securing and waterproof mechanism of the floodgate apparatus as claimed in claim 4, wherein the pillar has a movable plate disposed on the other inner wall, and a plurality of adjusting bars pass through the pillar and connected to the movable plate with one end, wherein a control bar is mounted at the other end of the respective adjusting bar for pushing the movable plate to secure the water retaining gate.

* * * * *